(12) United States Patent
Wang et al.

(10) Patent No.: US 12,401,455 B2
(45) Date of Patent: Aug. 26, 2025

(54) ELECTRONIC DEVICE AND METHOD FOR WIRELESS COMMUNICATION, AND COMPUTER-READABLE STORAGE MEDIUM

(71) Applicant: Sony Group Corporation, Tokyo (JP)

(72) Inventors: Xiaoxue Wang, Beijing (CN); Chen Sun, Beijing (CN)

(73) Assignee: SONY GROUP CORPORATION, Tokyo (JP)

(*) Notice: Subject to any disclaimer, the term of this patent is extended or adjusted under 35 U.S.C. 154(b) by 174 days.

(21) Appl. No.: 18/005,673

(22) PCT Filed: Aug. 26, 2021

(86) PCT No.: PCT/CN2021/114695
§ 371 (c)(1),
(2) Date: Jan. 17, 2023

(87) PCT Pub. No.: WO2022/048486
PCT Pub. Date: Mar. 10, 2022

(65) Prior Publication Data
US 2023/0275699 A1 Aug. 31, 2023

(30) Foreign Application Priority Data
Sep. 2, 2020 (CN) .......................... 202010910008.7

(51) Int. Cl.
*H04L 1/18* (2023.01)
*H04L 5/00* (2006.01)
(Continued)

(52) U.S. Cl.
CPC .............. *H04L 1/18* (2013.01); *H04L 5/0055* (2013.01); *H04W 72/02* (2013.01); *H04W 72/0446* (2013.01); *H04W 72/0453* (2013.01)

(58) Field of Classification Search
None
See application file for complete search history.

(56) References Cited

U.S. PATENT DOCUMENTS

| | | | |
|---|---|---|---|
| 2020/0220694 A1* | 7/2020 | Khoryaev | H04W 28/04 |
| 2020/0236518 A1* | 7/2020 | Lee | H04W 72/23 |
| 2021/0051737 A1 | 2/2021 | Sarkis et al. | |
| 2021/0385808 A1 | 12/2021 | Kwak | |

FOREIGN PATENT DOCUMENTS

| | | |
|---|---|---|
| CN | 108667570 A | 10/2018 |
| CN | 110139239 A | 8/2019 |

(Continued)

OTHER PUBLICATIONS

Moderator (Intel Corporation): "Outcome of [1 OOb-*t* NR-5G_V2X_NRSL-Mode-2-03]", 3GPP Draft; R1-2003037, 3rd Generation Partnership Project (3GPP), Mobile Competence Centre ; 650, Route Des Lucioles ; F-06921 Sophia-Antipolis Cedex ; France, vol. RAN WG1, No. e-Meeting: Apr. 20, 2020-Apr. 30, 2020 May 1, 2020 (May 1, 2020).

(Continued)

*Primary Examiner* — Mark D Featherstone
*Assistant Examiner* — Matthew W Wahlin
(74) *Attorney, Agent, or Firm* — XSENSUS LLP

(57) ABSTRACT

Provided are an electronic device and method for wireless communication, and a computer-readable storage medium. The electronic device for wireless communication comprises a processing circuit, which is configured to at least select, from a candidate resource set formed of predetermined candidate time-frequency resource blocks, a time-frequency resource block for the initial transmission and/or retransmission of a data block.

9 Claims, 10 Drawing Sheets

(51) Int. Cl.
    *H04W 72/02*     (2009.01)
    *H04W 72/0446*     (2023.01)
    *H04W 72/0453*     (2023.01)

(56) References Cited

FOREIGN PATENT DOCUMENTS

| | | | |
|---|---|---|---|
| CN | 110545534 A | 12/2019 | |
| TW | 201907739 A * | 2/2019 | ............. H04W 4/40 |
| WO | 2019/185830 A1 | 10/2019 | |
| WO | 2020/085732 A1 | 4/2020 | |
| WO | 2020/085885 A1 | 4/2020 | |
| WO | WO-2020163618 A1 * | 8/2020 | ........... H04L 1/0003 |

OTHER PUBLICATIONS

International Search Report and Written Opinion mailed on Dec. 7, 2021, received for PCT Application PCT/CN2021/114695, filed on Aug. 26, 2021, 13 pages including English Translation.

Apple, "Discussion on remaining issues on NR V2X MAC", 3GPP TSG-RAN WG2 e-Meeting #110bis, R2-2004759, Jun. 1-12, 2020, pp. 1-4.

Qualcomm Incorporated, "Sidelink Resource Allocation Mechanism for NR V2X", 3GPP TSG-RAN WG1 #98bis, R1-1912946, Nov. 18-22, 2019, pp. 1-10.

Zte et al., "Mode 2 resource allocation schemes on sidelink", 3GPP TSG RAN WG1 #99, R1-1912553, Nov. 18-22, 2019, 11 pages.

* cited by examiner

ELECTRONIC DEVICE AND METHOD FOR WIRELESS COMMUNICATION, AND COMPUTER-READABLE STORAGE MEDIUM

CROSS-REFERENCE TO RELATED APPLICATIONS

This application is based on PCT filing PCT/CN2021/114695, filed Aug. 26, 2021, which claims priority to Chinese Patent Application No. 202010910008.7, filed Sep. 2, 2020, the entire contents of each are incorporated herein by reference in its entirety.

FIELD

The present disclosure relates to the technical field of wireless communications, in particular to a selection of a time-frequency resource block for initially transmitting a data block and/or a time-frequency resource block for retransmitting a data block. More specifically, the present disclosure relates to an electronic apparatus and a method for wireless communications and a computer-readable storage medium.

BACKGROUND

In the existing communication methods, how to select a time-frequency resource block for initially transmitting a data block and/or a time-frequency resource block for retransmitting a data block to reduce communication delay and/or improve communication reliability is a key problem.

SUMMARY

A brief summary of the present disclosure is given hereinafter, to provide a basic understanding to some aspects of the present disclosure. It should be understood that this summary is not an exhaustive summary of the present disclosure. It is not intend to define a key part or an important part of the present disclosure, or to limit the scope of the present disclosure. The purpose is only to give some concepts in a simplified form, which serves as a preface of a more detailed description discussed later.

According to one aspect of the present disclosure, an electronic apparatus for wireless communications is provided. The electronic apparatus includes a processing circuit configured to select a time-frequency resource block for initially transmitting a data block and/or a time-frequency resource block for retransmitting a data block from at least a candidate resource set comprising predetermined candidate time-frequency resource blocks.

According to another aspect of the present disclosure, a method for wireless communications is provided. The method includes selecting a time-frequency resource block for initially transmitting a data block and/or a time-frequency resource block for retransmitting a data block from at least a candidate resource set comprising predetermined candidate time-frequency resource blocks.

According to other aspects of the present disclosure, a computer program code and a computer program product for implementing the above method for wireless communications, and a computer-readable storage medium recording the computer program code for implementing the above method for wireless communications are further provided.

These and other advantages of the present disclosure will be more apparent from the following detailed description of preferred embodiments of the present disclosure in conjunction with the accompanying drawings.

BRIEF DESCRIPTION OF THE DRAWINGS

In order to further set forth the above and other advantages and features of the present disclosure, the detailed description of embodiments of the present disclosure will be further described in detail below in conjunction with the accompanying drawings. The accompanying drawings together with the following detailed description are incorporated into and form a part of this specification. Elements with the same function and structure are denoted by the same reference numerals. It should be understood that, these accompanying drawings only illustrate, by way of example, typical embodiments of the present disclosure, and should not be regarded as a limitation to the scope of the present disclosure. In the accompanying drawings.

DETAILED DESCRIPTION OF EMBODIMENTS

Hereinafter, exemplary embodiments of the present disclosure will be described in conjunction with the accompanying drawings. For the sake of clarity and conciseness, not all features of the practical embodiments are described in this specification. However, it should be understood that multiple decisions specific to the embodiments have to be made in a process of developing any such practical embodiments, so as to achieve a specific object of a developer; for example, conforming to those constraints related to a system and a service, and these constraints may change as the embodiments differ. In addition, it should also be appreciated that, although the development work may be very complicated and time-consuming, for those skilled in the art benefiting from the present disclosure, such development work is only a routine task.

Here, it should further be noted that, in order to avoid obscuring the present disclosure due to unnecessary details, only an apparatus structure and/or processing steps closely related to the solution according to the present disclosure are shown in the accompanying drawings, and other details having little relevance to the present disclosure are omitted.

Figure 1:
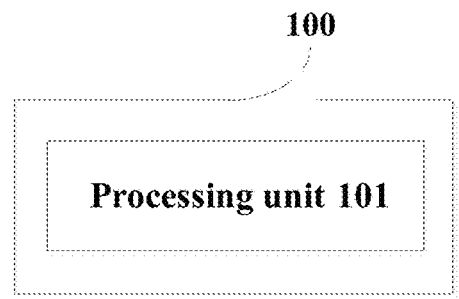
FIG. 1 shows a block diagram of functional modules of an electronic apparatus for wireless communications according to an embodiment of the present disclosure.

FIG. 1 shows a block diagram of functional modules of an electronic apparatus 100 for wireless communications according to an embodiment of the present disclosure. As shown in FIG. 1, the electronic apparatus 100 includes a processing unit 101. The processing unit 101 is configured to select a time-frequency resource block for initially transmitting a data block and/or a time-frequency resource block for retransmitting a data block from at least a candidate resource set comprising predetermined candidate time-frequency resource blocks.

The processing unit 101 may be implemented by one or more processing circuitry, and the processing circuitry may be implemented as, for example, a chip.

The electronic apparatus 100, for example, may be arranged on user equipment (UE) side or may be communicatively connected to user equipment. Here, it should also be noted that, the electronic apparatus 100 may be implemented at a chip level or at a device level. For example, the electronic apparatus 100 may function as user equipment, and may also include an external device such as a memory and a transceiver (not shown in the figure). The memory may be configured to store programs required for performing various functions by the user equipment and related data information. The transceiver may include one or more communication interfaces to support communication with different devices (for example, a base station, and other user equipment). Implementation of the transceiver is not specifically limited here. The base station may be an eNB or gNB, for example.

As an example, the processing unit 101 may be configured to select a time-frequency resource block for initially transmitting a data block and/or a time-frequency resource block for retransmitting a data block in a scenario of sidelink resource selection mode 2.

In 5G NR sidelink communication, there are two resource selection modes. In one resource selection mode, a base station schedules sidelink resources, which is referred to as resource selection mode 1 (mode 1). In another resource selection mode, UE autonomously selects resources, which is referred to as resource selection mode 2 (mode 2).

Figure 2:
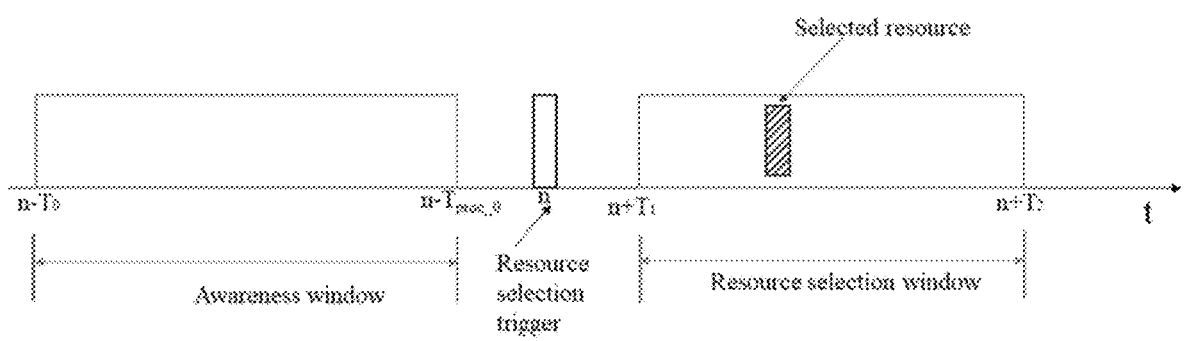
FIG. 2 is a schematic diagram showing a selection of time-frequency resources performed by transmitter user equipment in a sidelink resource selection mode 2 in the conventional technology.

FIG. 2 is a schematic diagram showing a selection of time-frequency resources performed by a transmitter user equipment in a sidelink resource selection mode 2 in the conventional technology. In the following description with reference to FIG. 2, a time-frequency resource is sometimes referred to as a resource.

The transmitter user equipment (TX UE for short) first predetermines a candidate resource set by a resource awareness process. As shown in FIG. 2, during a resource selection process in the sidelink resource selection mode 2, if a data packet triggers the resource selection at a time instant n, the TX UE excludes resources by using a result awared during the awareness window $[n-T_0,n-T_{proc,0}]$. During $[n-T_0,n-T_{proc,0}]$, the TX UE decodes the received sidelink control information (SCI) from other user equipment to obtain information on the occupied resources, so as to exclude these resources. The TX UE further measures a strength of Reference Signal Received Power (RSRP) over the whole frequency band. In a case that the strength of RSRP exceeds a threshold, it is determined that the corresponding frequency domain resources are occupied by other user equipment, such that these resources are excluded. The remaining resources after the resource exclusion may be used as available candidate resources, and the candidate resources set is a set of the available candidate resources. Next, the TX UE selects one or more resources from the candidate resource set by using a random resource selection mechanism for transmission. For example, the TX UE randomly select a resource with time domain between $[n+T_1,n+T_2]$ from the candidate resource set as a resource for initially transmitting the data block and/or retransmitting the data block. For example, as shown in FIG. 2, the TX UE selects a resource represented by a rectangular box filled with diagonal lines as the selected resource.

In FIG. 2, $T_0$ is a threshold of a maximum range of the awareness window, $T_{proc,0}$ represents a processing time at which UE decodes SCI and performs RSRP measurement, T1 represents a processing time for the UE from the resource selection trigger n to the earliest candidate resource, T2 represents a threshold of a maximum range of the resource selection window, which is required to be smaller than the allowable delay of the data block to be transmitted.

The predetermined candidate time-frequency resource blocks mentioned above may be the remaining resources after the resource exclusion mentioned in the description with reference to FIG. 2, or may be time-frequency resource blocks predetermined according to other methods.

Hereinafter, the description of selecting a time-frequency resource block for initially transmitting a data block and/or a time-frequency resource block for retransmitting a data block from a candidate resource set is made in combination with the scenario of sidelink resource selection mode 2. However, those skilled in the art should understand that the following description of selecting a time-frequency resource block for initially transmitting a data block and/or a time-frequency resource block for retransmitting a data block is not limited to the scenario of sidelink resource selection mode 2, and may be applied to other scenarios in 4G or 5G or other communication modes where user equipment selects a time-frequency resource block for initially transmitting a data block and/or a time-frequency resource block for retransmitting a data block.

As an example, the processing unit 101 may be configured to: divide a resource selection window including the candidate resource set into a predetermined number of sub-resource selection windows in a time dimension, such that each of the sub-resource selection windows has substantially the same time duration; and select a candidate time-frequency resource block, from at least one chronologically preceding sub-resource selection window which includes at least one candidate time-frequency resource block, as the time-frequency resource block for initially transmitting the data block.

As an example, in the scenario of sidelink resource selection mode 2, the predetermined number may be the number of time-frequency resource blocks indicated by the sidelink control information (SCI), that is, the number of time-frequency resource blocks that may be reserved indicated by SCI. For example, the predetermined number may be a sum of the number of times for initially transmitting the data block and the number of times for retransmitting the data block, that is, the number of times for retransmitting the data block plus 1.

Figure 3:
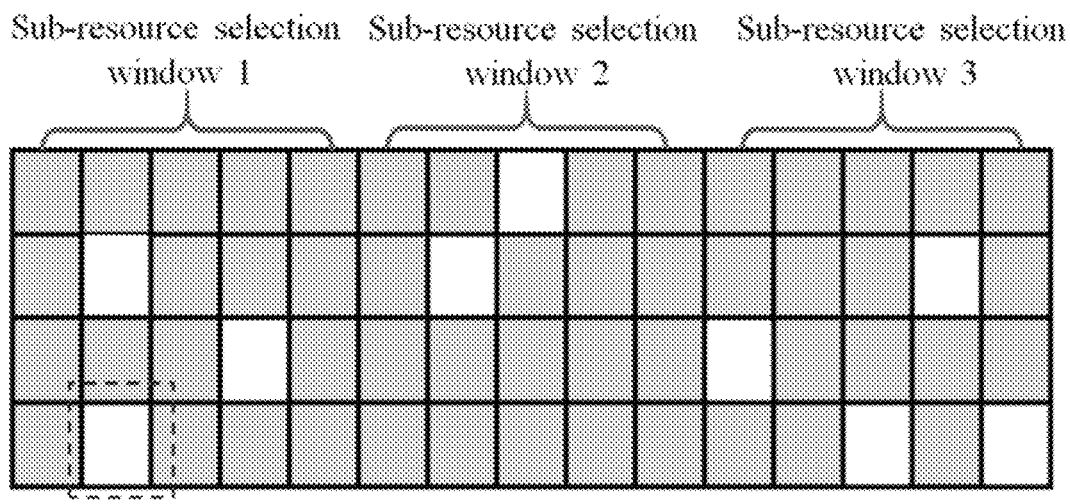
FIG. 3 is a diagram showing an example in which a resource selection window is divided into a predetermined number of sub-resource selection windows in a time dimension according to an embodiment of the present disclosure.

FIG. 3 is a diagram showing an example in which a resource selection window is divided into a predetermined number of sub-resource selection windows in a time dimension according to an embodiment of the present disclosure. In FIG. 3 and other figures to be described below, unavailable time-frequency resource blocks are represented by rectangular blocks filled with gray, and available candidate time-frequency resource blocks are represented by rectangular blocks filled with white. FIG. 3 shows 9 candidate time-frequency resource blocks, that is, the candidate resource set includes 9 candidate time-frequency resource blocks. A window including all the time-frequency resource blocks shown in FIG. 3 is a resource selection window. It is assumed that the preconfigured SCI indicates 3 time-frequency resource blocks, that is, the predetermined number Nmax is equal to 3. Therefore, the resource selection window shown in FIG. 3 is divided into 3 sub-resource selection windows (a sub-resource selection window 1, a sub-resource selection window 2 and a sub-resource selection window 3) in a time dimension, such that each of the sub-resource selection windows has substantially the same time duration (in the example shown in FIG. 3, each of the sub-resource selection windows has the time duration of 5 time-frequency resource blocks). In the example shown in FIG. 3, the sub-resource selection window 1 includes 3 candidate time-frequency resource blocks, the sub-resource selection window 2 includes 2 candidate time-frequency resource blocks, and the sub-resource selection window 3 includes 4 candidate time-frequency resource blocks.

The processing unit 101 may select a candidate time-frequency resource block from the sub-resource selection window 1 as the time-frequency resource block for initially transmitting a data block (for example, the time-frequency resource block shown with a dotted box in the sub-resource selection window 1 shown in FIG. 3). In this way, it can be ensured that the initial transmission of the data block occurs at a first 1/Nmax(⅓) of the resource selection window, such that the delay of the initial transmission of the data block can be reduced. In addition, for example, the processing unit 101 may select a candidate time-frequency resource block from the sub-resource selection window 2 as the time-frequency resource block for initially transmitting the data block. In this way, the delay of the initial transmission of the data block can be reduced, compared with a case in which a candidate time-frequency resource block is selected from the sub-resource selection window 3 as the time-frequency resource block for initially transmitting the data block. Therefore, the electronic apparatus 100 according to the embodiment of the present disclosure can reduce the delay of the initial transmission of the data block, and thus is suitable for some services with high delay requirements, such as safety information notification, in-vehicle games and the like.

Those skilled in the art can understand that FIG. 3 is only an example. In other examples, the number of candidate time-frequency resource blocks included in the candidate resource set, the predetermined number Nmax, and positions of candidate time-frequency resource blocks in the resource selection window may be different from the example shown in FIG. 3.

According to the communication mode in the conventional technology (for example, sidelink resource selection mode 2), a candidate time-frequency resource block is randomly selected from the candidate resource set as the time-frequency resource block for initially transmitting a data block. However, the random selection may set the selected time-frequency resource block to be in the chronologically later part of the resource selection window, resulting in an increase in the delay of the initial transmission of the data block.

However, the electronic apparatus 100 according to the embodiment of the present disclosure divides the resource selection window in the time dimension and selects a time-frequency resource block for initially transmitting the data block from the chronologically preceding sub-resource selection window, such that the delay of the initial transmission of the data block can be reduced.

As an example, the processing unit 101 may be further configured to select a candidate time-frequency resource block satisfying a predetermined condition, from candidate time-frequency resource blocks chronologically after the time-frequency resource block for initially transmitting the data block in the resource selection window, as the time-frequency resource block for retransmitting the data block. Preferably, the processing unit 101 may be further configured to select a candidate time-frequency resource block satisfying a predetermined condition, from candidate time-frequency resource blocks chronologically immediately after the time-frequency resource block for initially transmitting the data block in the resource selection window, as the time-frequency resource block for retransmitting the data block.

For example, in a scenario of 5G NR sidelink communication, there are two resource retransmission modes, including a blind retransmission and a retransmission based on HARQ-ACK. In the blind retransmission, the same data block (for example, a transport block (TB)) may be repeatedly transmitted using reserved resources in a case that any feedback information is not received. In the retransmission based on HARQ-ACK feedback information, the transmitter UE retransmits the data block by using the reserved resources after receiving NACK (negative acknowledgement) information. As the transmitter UE needs to wait for the feedback of ACK/NACK information, a time interval between two resource transmissions should satisfy a condition of Z=a+b, where a represents a time interval between the end of transmission of the last symbol in initial PSSCH (Physical SideLink Shared Channel) and the start of transmission of the first symbol in PSFCH (Physical SideLink Feedback Channel) that feedbacks PSSCH, and b represents a sum of a reception time of PSFCH and a preparation time for retransmitting the data block.

For example, in a case of retransmitting the data block based on a hybrid automatic repeat request acknowledgement (HARQ-ACK), satisfying the predetermined condition may refer to a case in which candidate time-frequency resource blocks satisfying a condition that the time interval between two data transmissions at least satisfies Z=a+b are used as time-frequency resource blocks for retransmitting the data block.

For example, in a case of retransmitting a data block based on the blind retransmission, satisfying the predetermined condition may refer to a case in which candidate time-frequency resource blocks that may be successfully reserved in the resource selection window are used as time-frequency resource blocks for retransmitting the data block.

The time-frequency resource block for retransmitting the data block may be included in the same sub-resource selection window as the time-frequency resource block for initially transmitting a data block, or may be included in a sub-resource selection window different from the sub-resource selection window including the time-frequency resource block for initially transmitting the data block.

For example, in a case of Nmax being equal to 3, it is assumed that the time-frequency resource block for initially transmitting a data block is selected in the sub-resource selection window 1. It is assumed that the sub-resource selection window 1 includes 2 candidate time-frequency resource blocks satisfying the above predetermined conditions, these two candidate time-frequency resource blocks are used as time-frequency resource blocks for retransmitting the data block. In this case, the time-frequency resource block for initially transmitting a data block and the time-frequency resource block for retransmitting the data block 2 times are both included in the sub-resource selection window 1, such that the delay of the retransmission of the data block can be reduced. In addition, for example, even if the time-frequency resource blocks for retransmitting the data block are not included in the sub-resource selection window 1 but included in the sub-resource selection window 2, the delay of the retransmission of the data block can be reduced compared with a case in which the time-frequency resource blocks for retransmitting the data block is randomly selected from the sub-resource selection window 3.

As an example, the processing unit 101 may be configured to: divide a resource selection window including the candidate resource set into a predetermined number of sub-resource selection windows, such that each of the sub-resource selection windows includes substantially the same number of candidate time-frequency resource blocks; and select a candidate time-frequency resource block from a most chronologically preceding sub-resource selection window as the time-frequency resource block for initially transmitting the data block.

As an example, in the scenario of sidelink resource selection mode 2, the predetermined number may be the number of time-frequency resource blocks indicated by the sidelink control information (SCI), that is, the number of time-frequency resource blocks that may be reserved indicated by SCI. For example, the predetermined number may be a sum of the number of times for initially transmitting the data block and the number of times for retransmitting the data block, that is, the number of times for retransmitting the data block plus 1.

Figure 4:
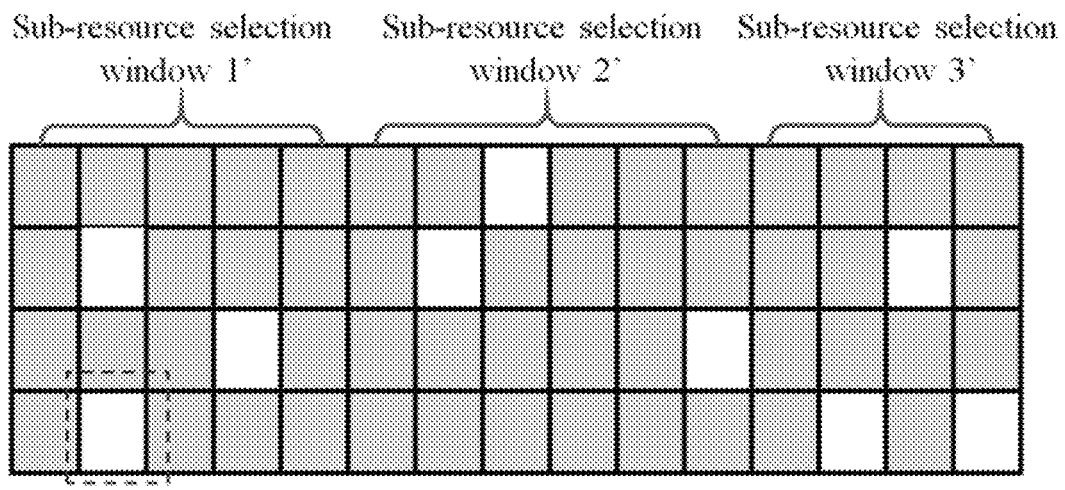
FIG. 4 is a diagram showing an example in which a resource selection window is divided based on the number of candidate time-frequency resource blocks according to an embodiment of the present disclosure.

FIG. 4 is a diagram showing an example in which a resource selection window is divided based on the number of candidate time-frequency resource blocks according to an embodiment of the present disclosure. The resource selection window in FIG. 4 is the same as that in FIG. 3, which is not be repeated here. As shown in FIG. 4, the resource selection window is divided into 3 sub-resource selection windows (a sub-resource selection window 1', a sub-resource selection window 2' and a sub-resource selection window 3'), such that each of the sub-resource selection windows includes the same number of candidate time-frequency resource blocks (in the example shown in FIG. 4, each of the sub-resource selection windows includes 3 candidate time-frequency resource blocks).

The processing unit 101 selects a candidate time-frequency resource block from the sub-resource selection window 1' as a time-frequency resource block for initially transmitting the data block (for example, the time-frequency resource block shown with a dotted box in the sub-resource selection window 1' shown in FIG. 4). In this way, the delay of the initial transmission of the data block can be reduced, such that the electronic apparatus 100 according to the embodiment of the present disclosure is suitable for some services with high delay requirements, such as safety information notification, in-vehicle games and the like.

As an example, the processing unit 101 may be further configured to select a candidate time-frequency resource block satisfying a predetermined condition, from candidate time-frequency resource blocks chronologically after the time-frequency resource block for initially transmitting the data block in the resource selection window, as the time-frequency resource block for retransmitting the data block. Preferably, the processing unit 101 may be further configured to select a candidate time-frequency resource block satisfying a predetermined condition, from candidate time-frequency resource blocks chronologically immediately after the time-frequency resource block for initially transmitting the data block in the resource selection window, as the time-frequency resource block for retransmitting the data block. The predetermined condition is the same as the predetermined condition described above, which are not repeated here. The time-frequency resource block for retransmitting the data block may be included in the same sub-resource selection window as the time-frequency resource block for initially transmitting the data block, or may be included in a sub-resource selection window different from the sub-resource selection window including the time-frequency resource block for initially transmitting the data block. For example, in a case of Nmax being equal to 3, it is assumed that the sub-resource selection window 1' includes 2 candidate time-frequency resource blocks satisfying the above predetermined conditions, these two candidate time-frequency resource blocks are used as a time-frequency resource block for retransmitting the data block. In this case, the time-frequency resource block for initially transmitting the data block and the time-frequency resource block for retransmitting the data block 2 times are both included in the sub-resource selection window 1', such that the delay of the retransmission of the data block can be reduced. In addition, for example, even if the time-frequency resource blocks for retransmitting the data block are not included in the sub-resource selection window 1' but included in the sub-resource selection window 2', the delay of retransmission of the data blocks can be reduced compared with a case in which the time-frequency resource blocks for retransmitting the data block is randomly selected from the sub-resource selection window 3'.

As an example, in a case of Nmax being equal to 3, each electronic apparatus selects the time-frequency resource block for initially transmitting the data block from the sub-resource selection window 1', and selects the time-frequency resource block for retransmitting the data block from the sub-resource selection window 2' and sub-resource selection window 3' respectively, such that the collision in a case that different electronic apparatuses select resources can be avoided.

As an example, in addition to the predetermined candidate time-frequency resource blocks, the candidate resource set further includes one or more candidate time-frequency resource blocks included in an abnormal resource pool which is different from a preconfigured resource pool including the predetermined candidate time-frequency resource blocks, and the resource selection window further includes the one or more candidate time-frequency resource blocks included in the abnormal resource pool.

Figure 5:
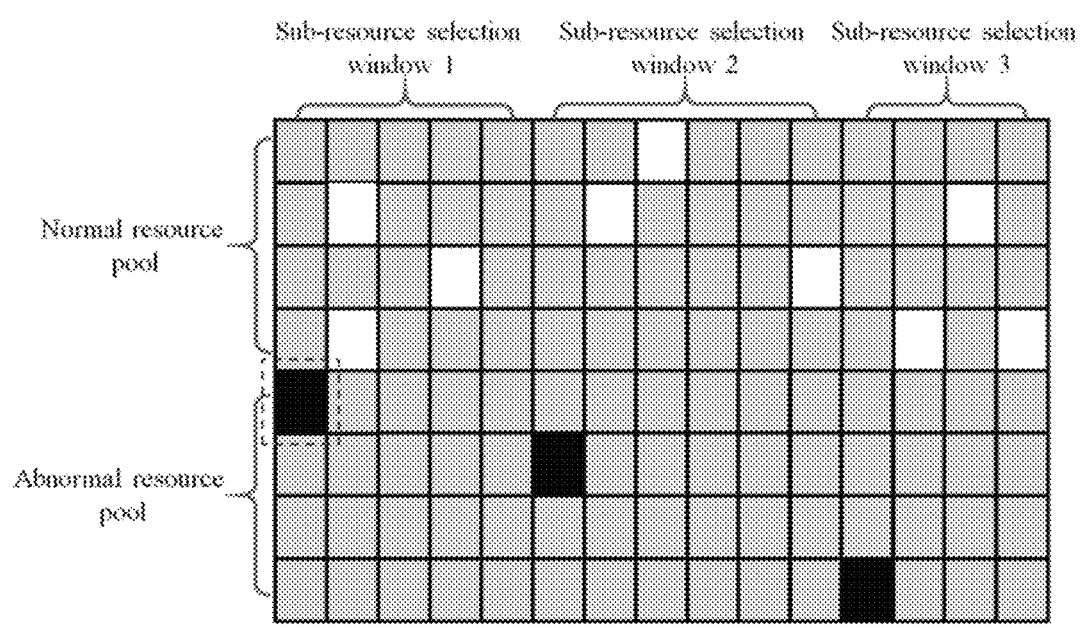
FIG. 5 is a diagram showing an example in which a resource selection window further includes one or more candidate time-frequency resource blocks included in an abnormal resource pool according to an embodiment of the present disclosure.

FIG. 5 is a diagram showing an example in which a resource selection window further includes one or more candidate time-frequency resource blocks included in an abnormal resource pool according to an embodiment of the present disclosure. 9 time-frequency resource blocks filled with white shown in FIG. 5 correspond to 9 candidate time-frequency resource blocks shown in FIG. 3 and FIG. 4, and the normal resource pool shown in FIG. 5 corresponds to the resource selection window shown in FIG. 3 and FIG. 4. 3 time-frequency resource blocks filled with black shown in FIG. 5 are available candidate time-frequency resource blocks included in the abnormal resource pool, and the time-frequency resource blocks filled with gray shown in FIG. 5 are unavailable time-frequency resource blocks. Compared with the examples described with reference to FIG. 3 and FIG. 4, in FIG. 5, the candidate resource set further includes 3 candidate time-frequency resource blocks included in the abnormal resource pool which is different from the normal resource pool, and the resource selection window further includes 3 candidate time-frequency resource blocks included in the abnormal resource pool.

The abnormal resource pool may enrich the composition of the candidate resource set, and may assist in the selection of the time-frequency resource block for initially transmitting the data block and/or the time-frequency resource block for retransmitting the data block, that is, the abnormal resource pool may increase the selectivity of the time-frequency resource block for initially transmitting the data block and/or the time-frequency resource block for retransmitting the data block. In addition, the abnormal resource pool may be customized based on the characteristics of different data services. In addition, since the candidate time-frequency resource blocks included in the abnormal resource pool may chronologically precede the candidate time-frequency resource blocks included in the normal resource pool, the delay of the initial transmission of the data block and/or the retransmission of the data block can be further reduced. For example, in the example of FIG. 5, the resource selection window is divided into sub-resource selection window 1, sub-resource selection window 2 and sub-resource selection window 3 in a time dimension, such that each of the sub-resource selection windows has substantially the same time duration (in the example shown in FIG. 5, each of the sub-resource selection windows has the time duration of 5 time-frequency resource blocks). The sub-resource selection window 1 includes 4 candidate time-frequency resource blocks, the sub-resource selection window 2 includes 3 candidate time-frequency resource blocks, and the sub-resource selection window 3 includes 5 candidate time-frequency resource blocks. Since the candidate time-frequency resource block included in the abnormal resource pool shown with dotted box in FIG. 5 chronologically precedes the candidate time-frequency resource blocks included in the normal resource pool, selecting this candidate time-frequency resource as the time-frequency resource block for initially transmitting the data block can further reduce the delay of the initial transmission of the data block. For the selection of time-frequency resource blocks for retransmitting the data block in the example of FIG. 5, except that the resource selection window further includes one or more candidate time-frequency resource blocks included in the abnormal resource pool, for other descriptions, reference may be made to the description of the example in FIG. 3, which are not repeated here.

Figure 6:
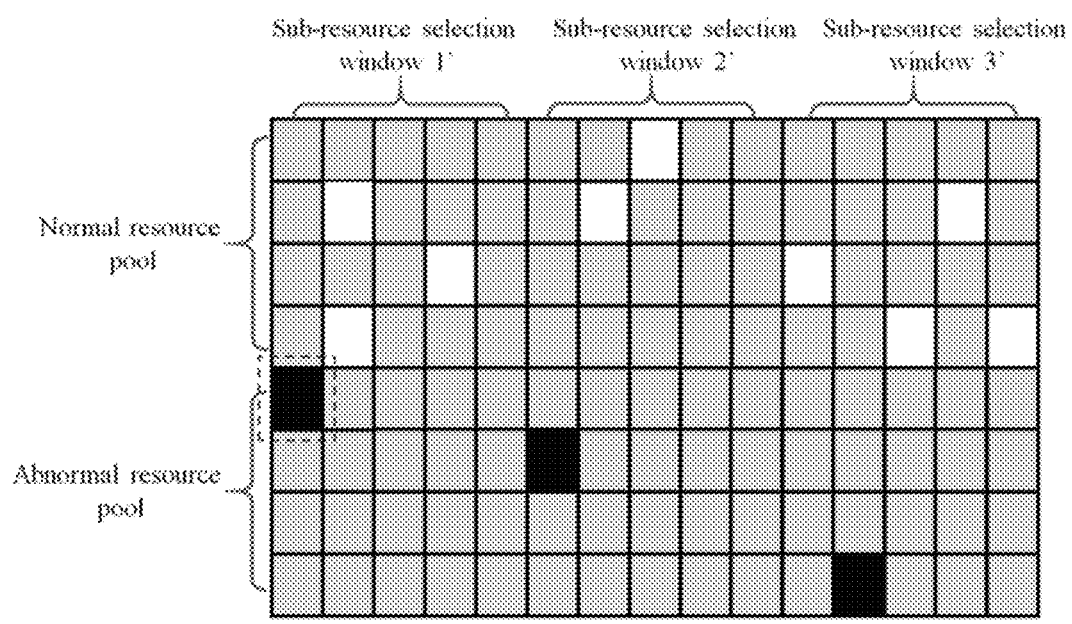
FIG. 6 is a diagram showing another example in which a resource selection window further includes one or more candidate time-frequency resource blocks included in an abnormal resource pool according to an embodiment of the present disclosure.

FIG. 6 is a diagram showing another example in which a resource selection window further includes one or more candidate time-frequency resource blocks included in an abnormal resource pool according to an embodiment of the present disclosure. The normal resource pool and the abnormal resource pool shown in FIG. 6 correspond to the normal resource pool and the abnormal resource pool shown in FIG. 5. In the example shown in FIG. 6, the resource selection window including one or more candidate time-frequency resource blocks in the abnormal resource pool is divided into 3 sub-resource selection windows (a sub-resource selection window 1', a sub-resource selection window 2' and a sub-resource selection window 3') based on the number of candidate time-frequency resource blocks, such that each of the sub-resource selection windows includes the same number of candidate time-frequency resource blocks (in the example shown in FIG. 6, each of the sub-resource selection windows includes 4 candidate time-frequency resource blocks).

The processing unit 101 may select a candidate time-frequency resource block from the sub-resource selection window 1' as a time-frequency resource block for initially transmitting the data block (for example, a time-frequency resource block shown with a dotted box in the sub-resource selection window 1' shown in FIG. 6), such that the delay of the initial transmission of the data block can be further reduced.

For the selection of the time-frequency resource block for retransmitting the data block in the example in FIG. 6, except that the resource selection window further includes one or more candidate time-frequency resource blocks included in the abnormal resource pool, for other descriptions, reference may be made to the description of the example in FIG. 4, which are not repeated here.

As mentioned above, in a case of retransmitting the data block based on HARQ-ACK, the time interval between two data transmissions should satisfy a condition of Z=a+b, that is, it is required to select the time-frequency resource blocks satisfying the time interval Z from the candidate resource set as the time-frequency resource blocks for retransmitting the data block. However, in this case, some services with strict delay requirements cannot be satisfied.

The processing unit 101 may be configured to: between retransmitting the data block respectively using two time-frequency resource blocks based on HARQ-ACK, perform at least one blind retransmission of the data block, so as to reduce the delay of the transmission, thereby satisfying some services with strict delay requirements. In addition, in a hybrid retransmission mechanism using a combination of the blind retransmission and the retransmission based on HARQ-ACK, since it is not required for the blind retransmission to satisfy the requirements of time interval Z, the number of times of the transmission of the data block in the same time period is increased, thereby improving the reliability of the transmission of the data block.

As an example, the processing unit 101 may be configured to: between retransmitting the data block respectively using two time-frequency resource blocks based on HARQ-ACK, perform at least one blind retransmission of the data block using at least one candidate time-frequency resource block included in the abnormal resource pool which is different from the preconfigured resource pool including the predetermined candidate time-frequency resource blocks.

As described above, since at least one blind retransmission of the data block is performed between retransmitting the data block respectively using two time-frequency resource blocks based on HARQ-ACK, the delay of the retransmission of the data block can be reduced and the reliability of the transmission of the data block is increased.

In addition, since the blind retransmission may be performed by using the candidate time-frequency resource blocks included in the abnormal resource pool, the selectivity of time-frequency resource blocks for the blind retransmission of data blocks is increased.

As mentioned above, in a case of retransmitting the data block based on HARQ-ACK, the time interval between two data transmissions should satisfy a condition of Z=a+b, that is, it is required to select the time-frequency resource blocks satisfying the time interval Z from the candidate resource set as the time-frequency resource blocks for retransmitting the data block. However, in some cases, the time-frequency resources satisfying the time interval Z may not be found in the candidate resource set (for example, the time interval Z cannot be satisfied between the time-frequency resource block for initially transmitting the data block and the time-frequency resource block for retransmitting the data block, and/or the time interval Z cannot be satisfied between the time-frequency resource blocks for retransmitting the data block). In the conventional technology, if the time-frequency resources satisfying the time interval Z cannot be found in the candidate resource set, the problem can be autonomously solved by the behavior of the transmitter UE, but the time-frequency resource block for retransmitting the data block have to satisfy the requirement of the time interval Z. However, the specific behavior of the transmitter UE is not confirmed in the conventional technology. Hereinafter, the specific behavior of the electronic apparatus 100 according to the embodiment of the present disclosure in a case that the time-frequency resources satisfying the time interval Z cannot be found in the candidate resource set will be described.

As an example, the processing unit 101 may be configured to: in a case that the candidate resource set does not include candidate time-frequency resource blocks which satisfy a predetermined retransmission time interval for retransmitting the data block based on HARQ-ACK, increase a threshold of a reference signal received power (RSRP) to increase the number of the candidate time-frequency resource blocks in the candidate resource set to select candidate time-frequency resource blocks satisfying the predetermined retransmission time interval from the candidate resource set including the increased number of candidate time-frequency resource blocks for retransmitting the data block. The processing circuit is configured to include a time-frequency resource block having a RSRP lower than the threshold as a candidate time-frequency resource block in the candidate resource set in a resource awareness period in which the candidate time-frequency resource block is predetermined.

For example, the predetermined retransmission time interval is the time interval Z mentioned above.

In the resource awareness period described with reference to FIG. 2 for example, the electronic apparatus 100 is configured to include a time-frequency resource block having a RSRP lower than a threshold as a candidate time-frequency resource block in the candidate resource set and exclude a time-frequency resource block having a RSRP higher than or equal to the threshold from the candidate resource set by comparing the RSRP measurement values of the candidate time-frequency resource blocks with the threshold, so as to screen out the candidate time-frequency resource blocks. Therefore, by increasing the threshold of RSRP, the number of candidate time-frequency resource blocks included in the candidate resource set can be increased, such that candidate time-frequency resource blocks satisfying the predetermined retransmission time interval are selected from the candidate resource set including the increased number of candidate time-frequency resource blocks.

As an example, the processing unit 101 may be configured to: in a case that the candidate resource set does not include candidate time-frequency resource blocks which satisfy a predetermined retransmission time interval for retransmitting the data block based on HARQ-ACK, select candidate time-frequency resource blocks satisfying the predetermined retransmission time interval from at least one candidate time-frequency resource block included in the abnormal resource pool which is different from the preconfigured resource pool including the predetermined candidate time-frequency resource blocks for retransmitting the data block.

At least one candidate time-frequency resource block included in the abnormal resource pool increases the number of available candidate time-frequency resource blocks. Therefore, it may be possible to select a candidate time-frequency resource block satisfying the predetermined retransmission time interval from the abnormal resource pool.

As an example, the processing unit 101 may be configured to: in a case that the candidate resource set does not include candidate time-frequency resource blocks satisfying a predetermined retransmission time interval for retransmitting the data block based on HARQ-ACK, change a method for retransmitting the data block by adding a field that indicates a method for retransmitting a data block in control information of data transmission. The field is used to indicate that the retransmission of the data block is performed based on one of HARQ-ACK, a blind retransmission as well as a hybrid retransmission including HARQ-ACK and the blind retransmission.

For example, in a case that the candidate resource set does not include candidate time-frequency resource blocks satisfying a predetermined retransmission time interval for retransmitting the data block based on HARQ-ACK, the processing unit 101 may indicate the change in the current retransmission method by the above-mentioned field that indicates the method for retransmitting the data block (for example, two bits may be used to indicate that the current retransmission is performed based on HARQ-ACK, the blind retransmission or the hybrid retransmission). In a case that the candidate resource set does not include candidate time-frequency resource blocks satisfying a predetermined retransmission time interval for retransmitting the data block based on HARQ-ACK, the normal data transmission may be guaranteed by changing the current retransmission method (for example, change to the blind retransmission or the hybrid retransmission), thereby reducing the delay of the transmission of the data block.

As an example, the above control information is SCI. For example, the method for retransmitting the data block is changed by adding a field that indicates the method for retransmitting the data block in SCI.

Those skilled in the art may understand that the above-described embodiments of selecting a time-frequency resource block for initially transmitting a data block, selecting a time-frequency resource block for retransmitting a data block, and selecting a time-frequency resource block for retransmitting a data block in a case that the candidate resource set does not include candidate time-frequency resource blocks satisfying a predetermined retransmission time interval for retransmitting the data block based on HARQ-ACK may be embodied independently or combined with each other.

In the process of describing the electronic apparatus for wireless communications in the above embodiments, some processes or methods are also disclosed. Hereinafter, an overview of the methods is given without repeating some details that are discussed above. However, it should be noted that, although the methods are disclosed while describing the electronic apparatus for wireless communications, the methods do not necessarily employ or are not necessarily performed by the aforementioned components. For example, the embodiments of the electronic apparatus for wireless communications may be partially or completely implemented with hardware and/or firmware, and the method for wireless communications described below may be performed by a computer-executable program completely, although the hardware and/or firmware for the electronic apparatus for wireless communications may also be used in the methods.

Figure 7:
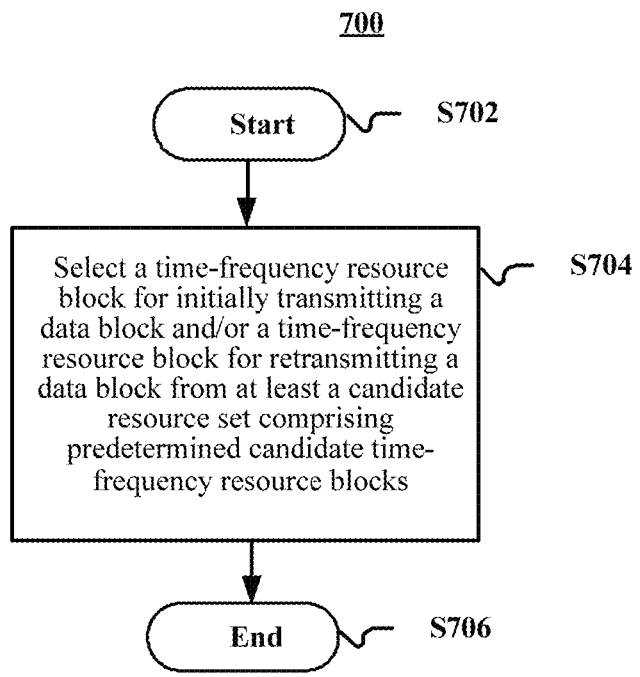
FIG. 7 shows a flowchart of a method for wireless communications according to an embodiment of the present disclosure.

FIG. 7 shows a flowchart of a method 700 for wireless communications according to an embodiment of the present disclosure. The method 700 starts at step S702. In step S704, a time-frequency resource block for initially transmitting a data block and/or a time-frequency resource block for retransmitting a data block is selected from at least a candidate resource set comprising predetermined candidate time-frequency resource blocks. The method 700 ends at step S706.

The method may be performed by the electronic apparatus 100 described above, for example. The specific details may be found in the description in the corresponding position above, which are not repeated here.

The technology according to the present disclosure may be applied to various products.

The electronic apparatus 100 may be implemented as various user equipment. The user equipment may be implemented as a mobile terminal (such as a smart phone, a tablet personal computer (PC), a notebook PC, a portable game terminal, a portable/dongle type mobile router, and a digital camera) or a in-vehicle terminal (such as an vehicle navigation device). The user equipment may also be implemented as a terminal that executes Machine-to-Machine (M2M) communications (which is also referred to as a machine type communication (MTC) terminal). In addition, the user equipment may be a wireless communication module (such as an integrated circuit module including a single chip) installed on each of the above-mentioned terminals.

Application Examples of Base Station (First Application Example)

Figure 8:
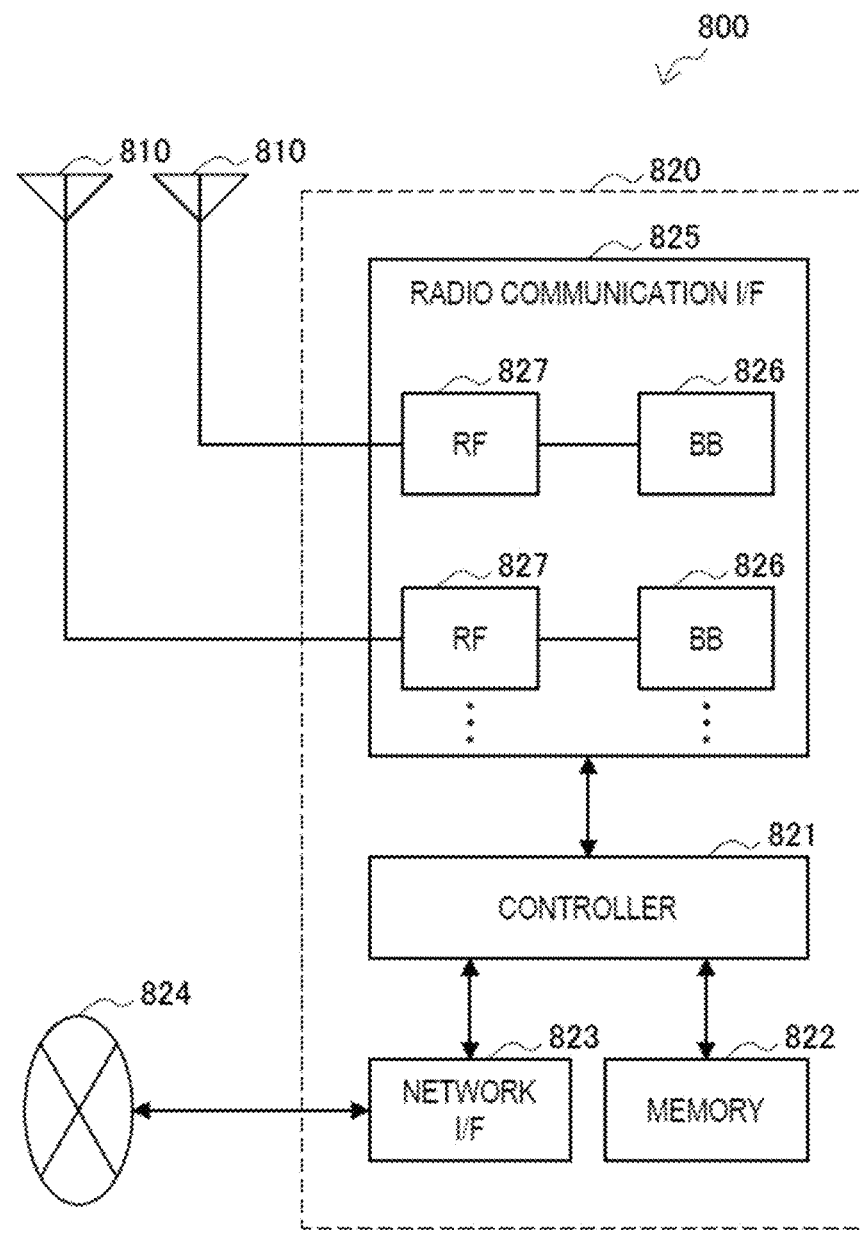
FIG. 8 is a block diagram showing a first example of a schematic configuration of an eNB or gNB to which the technology according to the present disclosure may be applied.

FIG. 8 is a block diagram showing a first example of a schematic configuration of an eNB or gNB to which the technology according to the present disclosure may be applied. Note that, the following description takes an eNB as an example, which may also be applied to a gNB. An eNB 800 includes one or more antennas 810 and a base station device 820. The base station device 820 and each antenna 810 may be connected to each other via an RF cable.

Each of the antennas 810 includes a single antenna element or multiple antenna elements (such as multiple antenna elements included in a Multi-Input Multi-Output (MIMO) antenna), and is used for the base station device 820 to transmit and receive wireless signals. As shown in FIG. 8, the eNB 800 may include multiple antennas 810. For example, the multiple antennas 810 may be compatible with multiple frequency bands used by the eNB 800. Although FIG. 8 shows an example in which the eNB 800 includes multiple antennas 810, the eNB 800 may also include a single antenna 810.

The base station device 820 includes a controller 821, a memory 822, a network interface 823, and a radio communication interface 825.

The controller 821 may be, for example, a CPU or a DSP, and manipulate various functions of a higher layer of the base station device 820. For example, the controller 821 generates a data packet based on data in a signal processed by the radio communication interface 825, and transfers the generated packet via the network interface 823. The controller 821 may bundle data from multiple baseband processors to generate a bundled packet, and transfer the generated bundled packet. The controller 821 may have a logical function for performing control such as radio resource control, radio bearer control, mobility management, admission control, and scheduling. The control may be executed in conjunction with nearby eNBs or a core network node. The memory 822 includes an RAM and an ROM, and stores programs executed by the controller 821 and various types of control data (such as a terminal list, transmission power data, and scheduling data).

The network interface 823 is a communication interface for connecting the base station device 820 to a core network 824. The controller 821 may communicate with the core network node or another eNB via the network interface 823. In this case, the eNB 800 and the core network node or other eNBs may be connected to each other via a logical interface (such as an S1 interface and an X2 interface). The network interface 823 may also be a wired communication interface, or a wireless communication interface for a wireless backhaul line. If the network interface 823 is a wireless communication interface, the network interface 823 may use a higher frequency band for wireless communications than the frequency band used by the radio communication interface 825.

The radio communication interface 825 supports any cellular communication scheme (such as Long Term Evolution (LTE) and LTE-Advanced), and provides wireless connection to a terminal located in a cell of the eNB 800 via an antenna 810. The radio communication interface 825 may generally include, for example, a baseband (BB) processor 826 and an RF circuit 827. The BB processor 826 may execute, for example, encoding/decoding, modulation/demodulation, and multiplexing/de-multiplexing, and execute various types of signal processing of layers (e.g., L1, Medium Access Control (MAC), Radio Link Control (RLC), and Packet Data Convergence Protocol (PDCP)). Instead of the controller 821, the BB processor 826 may have a part or all of the above-mentioned logical functions. The BB processor 826 may be a memory storing a communication control program, or a module including a processor and related circuits configured to execute the program. An update program may cause the function of the BB processor 826 to be changed. The module may be a card or blade inserted into a slot of the base station device 820. Alternatively, the module may also be a chip mounted on a card or blade. In addition, the RF circuit 827 may include, for example, a frequency mixer, a filter, and an amplifier, and transmit and receive a wireless signal via the antenna 810.

As shown in FIG. 8, the radio communication interface 825 may include multiple BB processors 826. For example, the multiple BB processors 826 may be compatible with multiple frequency bands used by the eNB 800. As shown in FIG. 8, the radio communication interface 825 may include multiple RF circuits 827. For example, the multiple RF circuits 827 may be compatible with multiple antenna elements. Although FIG. 8 shows an example in which the radio communication interface 825 includes multiple BB processors 826 and multiple RF circuits 827, the radio communication interface 825 may also include a single BB processor 826 or a single RF circuit 827.

In the eNB 800 as shown in FIG. 8, the transceiver may be implemented by a radio communication interface 825. At least a part of the function may also be implemented by the controller 821.

(Second Application Example)

Figure 9:
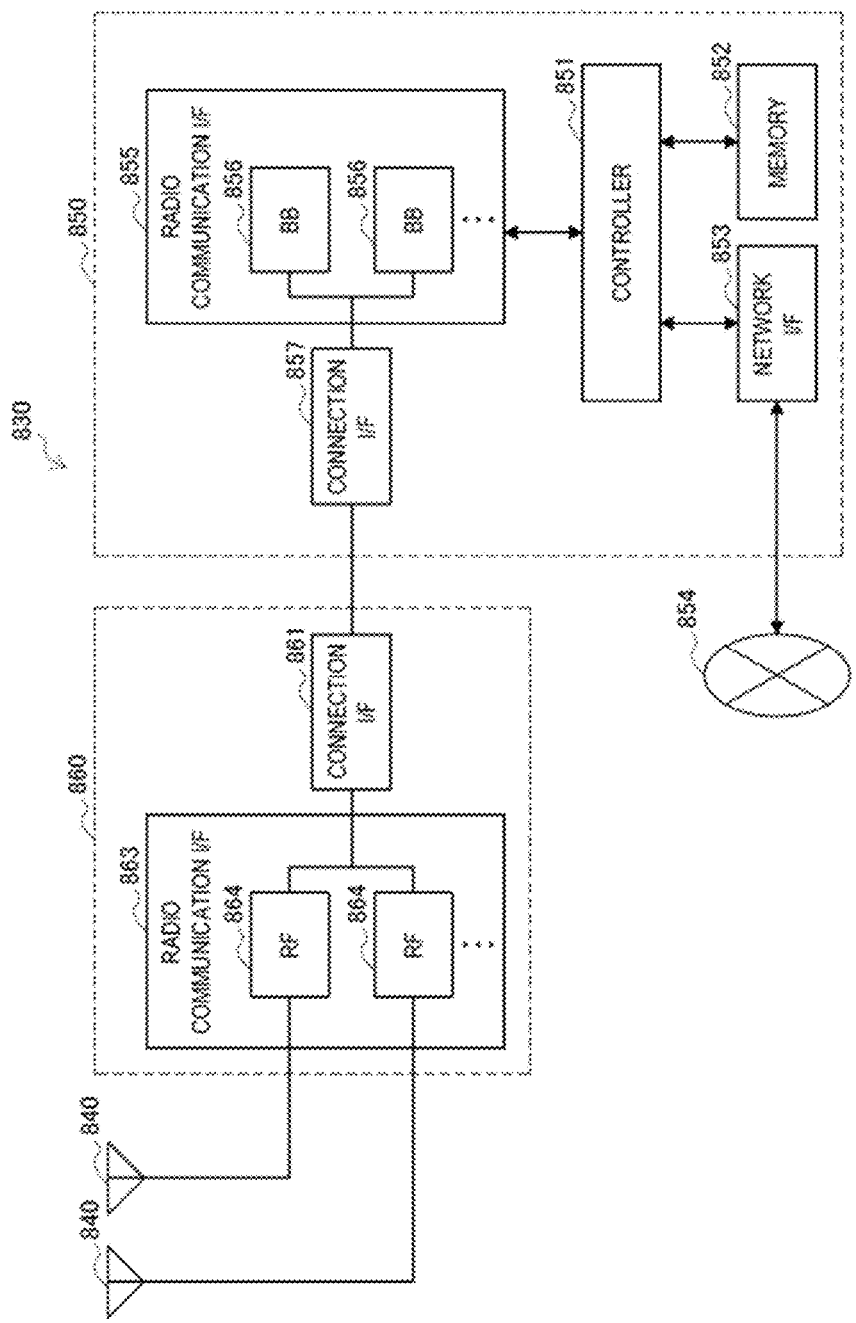
FIG. 9 is a block diagram showing a second example of a schematic configuration of an eNB or gNB to which the technology according to the present disclosure may be applied.

FIG. 9 is a block diagram showing a second example of a schematic configuration of an eNB or gNB to which the technology according to the present disclosure may be applied. Note that similarly, the following description takes an eNB as an example, which may also be applied to a gNB. An eNB 830 includes one or more antennas 840, a base station device 850, and an RRH 860. The RRH 860 and each antenna 840 may be connected to each other via an RF cable. The base station device 850 and the RRH 860 may be connected to each other via a high-speed line such as an optical fiber cable.

Each of the antennas 840 includes a single antenna element or multiple antenna elements (such as multiple antenna elements included in a MIMO antenna) and is used for the RRH 860 to transmit and receive a wireless signal. As shown in FIG. 9, the eNB 830 may include multiple antennas 840. For example, the multiple antennas 840 may be compatible with multiple frequency bands used by the eNB 830. Although FIG. 9 shows an example in which the eNB 830 includes multiple antennas 840, the eNB 830 may also include a single antenna 840.

The base station device 850 includes a controller 851, a memory 852, a network interface 853, a radio communication interface 855, and a connection interface 857. The controller 851, the memory 852, and the network interface 853 are the same as the controller 821, the memory 822, and the network interface 823 as described with reference to FIG. 8.

The radio communication interface 855 supports any cellular communication scheme (such as LTE and LTE-Advanced), and provides wireless communications to a terminal located in a sector corresponding to the RRH 860 via the RRH 860 and the antenna 840. The radio communication interface 855 may generally include, for example, a BB processor 856. The BB processor 856 is the same as the BB processor 826 as described with reference to FIG. 8 except that the BB processor 856 is connected to an RF circuit 864 of the RRH 860 via the connection interface 857. As shown in FIG. 9, the radio communication interface 855 may include multiple BB processors 856. For example, the multiple BB processors 856 may be compatible with multiple frequency bands used by the eNB 830. Although FIG. 9 shows an example in which the radio communication interface 855 includes multiple BB processors 856, the radio communication interface 855 may also include a single BB processor 856.

The connection interface 857 is an interface for connecting the base station device 850 (radio communication interface 855) to the RRH 860. The connection interface 857 may also be a communication module for communication in the above-mentioned high-speed line that connects the base station device 850 (radio communication interface 855) to the RRH 860.

The RRH 860 includes a connection interface 861 and a radio communication interface 863.

The connection interface 861 is an interface for connecting the RRH 860 (radio communication interface 863) to the base station device 850. The connection interface 861 may also be a communication module for communication in the above-mentioned high-speed line.

The radio communication interface 863 transfers and receives wireless signals via the antenna 840. The radio communication interface 863 may generally include, for example, an RF circuit 864. The RF circuit 864 may include, for example, a frequency mixer, a filter, and an amplifier, and transfer and receive wireless signals via the antenna 840. As shown in FIG. 9, the radio communication interface 863 may include multiple RF circuits 864. For example, the multiple RF circuits 864 may support multiple antenna elements. Although FIG. 9 shows an example in which the radio communication interface 863 includes multiple RF circuits 864, the radio communication interface 863 may also include a single RF circuit 864.

In the eNB 830 as shown in FIG. 9, the transceiver may be implemented by the radio communication interface 855. At least a part of the function may also be implemented by the controller 851.

Application Example of User Equipment (First Application Example)

Figure 10:
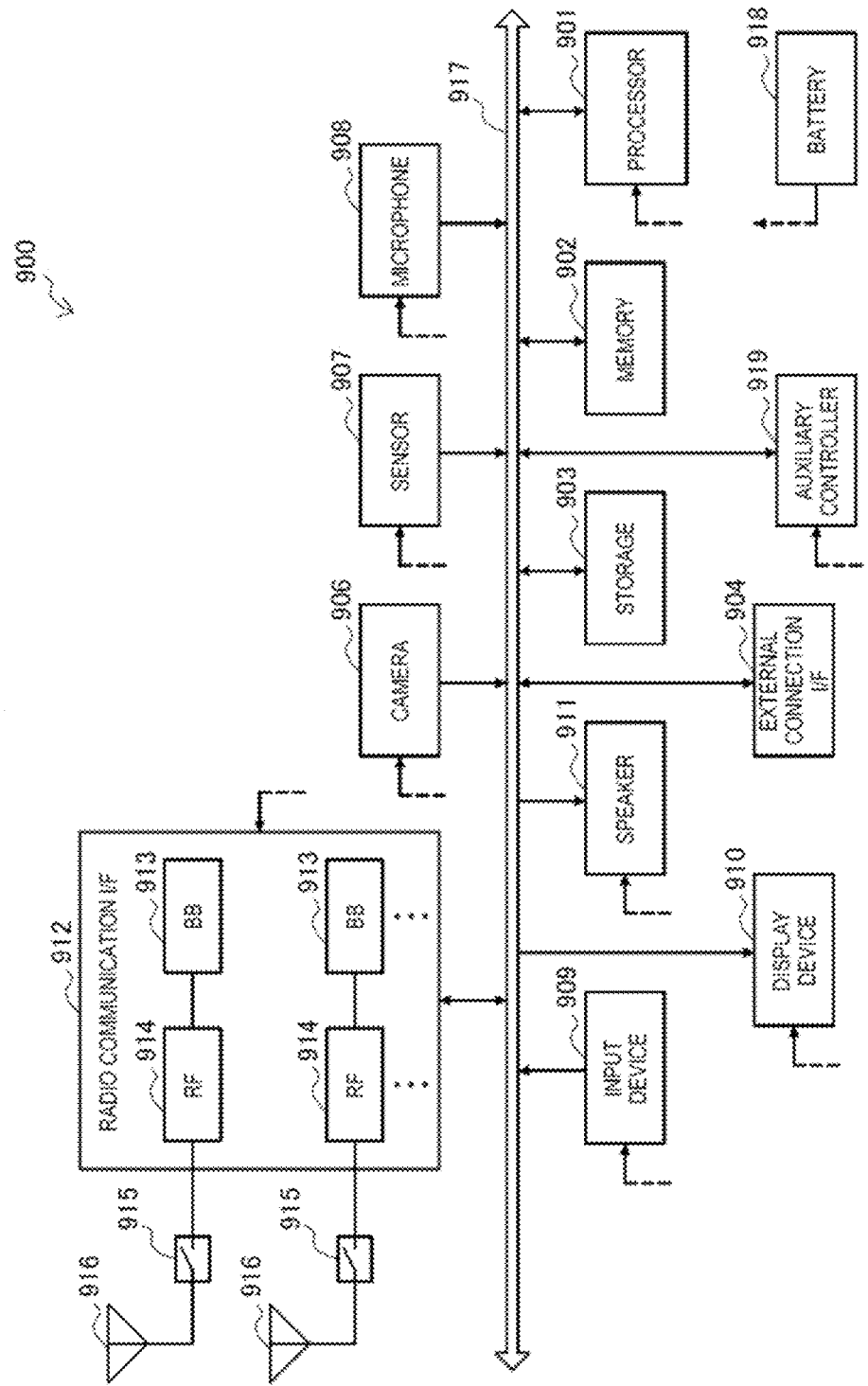
FIG. 10 is a block diagram showing an example of a schematic configuration of a smart phone to which the technology according to the present disclosure may be applied.

FIG. 10 is a block diagram showing an example of a schematic configuration of a smart phone 900 to which the technology according to the present disclosure may be applied. The smart phone 900 includes a processor 901, a memory 902, a storage 903, an external connection interface 904, an camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls the functions of the application layer and other layers of the smart phone 900. The memory 902 includes an RAM and an ROM, and stores programs executed by the processor 901 and data. The storage 903 may include a storage medium such as a semiconductor memory and a hard disk. The external connection interface 904 is an interface for connecting an external device (such as a memory card and a universal serial bus (USB) device) to the smart phone 900.

The camera 906 includes an image sensor (such as a charge coupled device (CCD) and a complementary metal oxide semiconductor (CMOS)), and generates a captured image. The sensor 907 may include a group of sensors, such as a measurement sensor, a gyro sensor, a geomagnetic sensor, and an acceleration sensor. The microphone 908 converts sound input to the smart phone 900 into an audio signal. The input device 909 includes, for example, a touch sensor configured to detect a touch on a screen of the display device 910, a keypad, a keyboard, a button, or a switch, and receives an operation or information input from the user. The display device 910 includes a screen (such as a liquid crystal display (LCD) and an organic light emitting diode (OLED) display), and displays an output image of the smart phone 900. The speaker 911 converts the audio signal output from the smart phone 900 into sound.

The radio communication interface 912 supports any cellular communication scheme (such as LTE and LTE-Advanced), and executes wireless communications. The radio communication interface 912 may generally include, for example, a BB processor 913 and an RF circuit 914. The BB processor 913 may execute, for example, encoding/decoding, modulation/demodulation, and multiplexing/de-multiplexing, and execute various types of signal processing for wireless communications. In addition, the RF circuit 914 may include, for example, a frequency mixer, a filter, and an amplifier, and transfer and receive wireless signals via the antenna 916. Note that, although the figure shows a case where one RF link is connected with one antenna, this is only schematic, and a case where one RF link is connected with multiple antennas via multiple phase shifters is also included. The radio communication interface 912 may be a chip module on which the BB processor 913 and the RF circuit 914 are integrated. As shown in FIG. 10, the radio communication interface 912 may include multiple BB processors 913 and multiple RF circuits 914. Although FIG. 10 shows an example in which the radio communication interface 912 includes multiple BB processors 913 and multiple RF circuits 914, the radio communication interface 912 may also include a single BB processor 913 or a single RF circuit 914.

Furthermore, in addition to the cellular communication scheme, the radio communication interface 912 may support other types of wireless communication schemes, such as a short-range wireless communication scheme, a near field communication scheme, and a wireless local area network (LAN) scheme. In this case, the radio communication interface 912 may include a BB processor 913 and an RF circuit 914 for each wireless communication scheme.

Each of the antenna switches 915 switches a connection destination of the antenna 916 among multiple circuits included in the radio communication interface 912 (for example, circuits for different wireless communication schemes).

Each of the antennas 916 includes a single antenna element or multiple antenna elements (such as multiple antenna elements included in a MIMO antenna), and is used for the radio communication interface 912 to transmit and receive wireless signals. As shown in FIG. 10, the smart phone 900 may include multiple antennas 916. Although FIG. 10 shows an example in which the smart phone 900 includes multiple antennas 916, the smart phone 900 may also include a single antenna 916.

Furthermore, the smart phone 900 may include an antenna 916 for each wireless communication scheme. In this case, the antenna switch 915 may be omitted from the configuration of the smart phone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to each block of the smart phone 900 as shown in FIG. 10 via a feeder line, which is partially shown as a dashed line in the figure. The auxiliary controller 919 manipulates the least necessary function of the smart phone 900 in a sleep mode, for example.

In the smart phone 900 as shown in FIG. 10, in a case that the electronic apparatus 100 described with reference to FIG. 1 is implemented as user equipment, a transceiver of the electronic apparatus 100 may be implemented by the radio communication interface 912. At least a part of the function may also be implemented by the processor 901 or the auxiliary controller 919. For example, the processor 901 or the auxiliary controller 919 may select a time-frequency resource block for initially transmitting a data block and/or a time-frequency resource block for retransmitting a data block by using the processing unit 101 described with reference to FIG. 1.

(Second Application Example)

Figure 11:
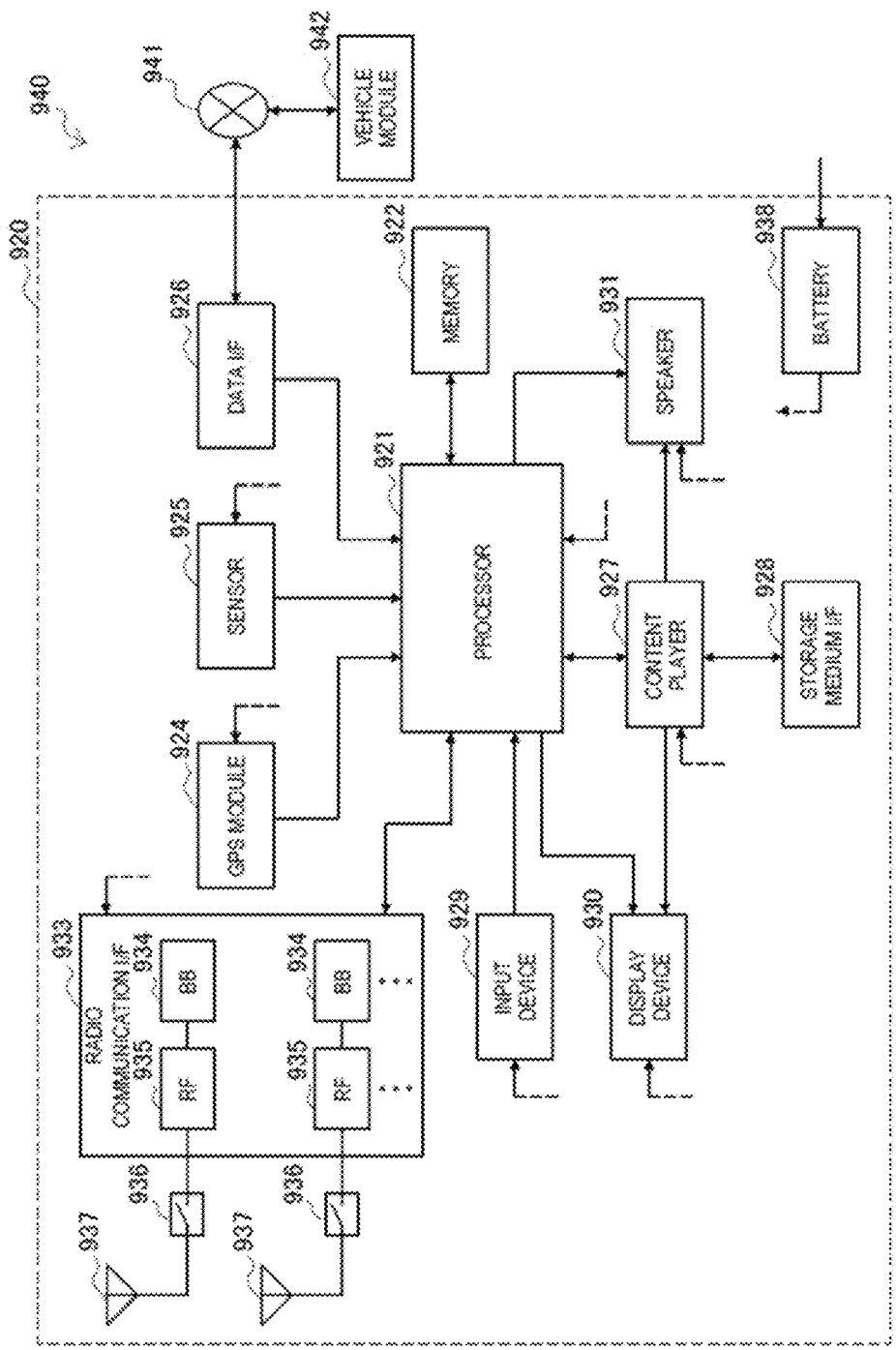
FIG. 11 is a block diagram showing an example of a schematic configuration of a vehicle navigation device to which the technology according to the present disclosure may be applied.

FIG. 11 is a block diagram showing an example of a schematic configuration of a vehicle navigation device to which the technology according to the present disclosure may be applied. The vehicle navigation device 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls the navigation function and additional functions of the vehicle navigation device 920. The memory 922 includes an RAM and an ROM, and stores programs executed by the processor 921 and data.

The GPS module 924 uses a GPS signal received from a GPS satellite to measure a position of the vehicle navigation device 920 (such as latitude, longitude, and altitude). The sensor 925 may include a group of sensors, such as a gyro sensor, a geomagnetic sensor, and an air pressure sensor. The data interface 926 is connected to, for example, an in-vehicle network 941 via a terminal which is not shown, and acquires data generated by a vehicle (such as vehicle speed data).

The content player 927 reproduces content stored in a storage medium (such as a CD and a DVD), which is inserted into the storage medium interface 928. The input device 929 includes, for example, a touch sensor configured to detect a touch on a screen of the display device 930, a button, or a switch, and receives an operation or information input from the user. The display device 930 includes a screen such as an LCD or OLED display, and displays an image of a navigation function or reproduced content. The speaker 931 outputs the sound of the navigation function or the reproduced content.

The radio communication interface 933 supports any cellular communication scheme (such as LTE and LTE-Advanced), and executes wireless communication. The radio communication interface 933 may generally include, for example, a BB processor 934 and an RF circuit 935. The BB processor 934 may execute, for example, encoding/decoding, modulation/demodulation, and multiplexing/de-multiplexing, and execute various types of signal processing for wireless communications. In addition, the RF circuit 935 may include, for example, a frequency mixer, a filter, and an amplifier, and transfer and receive wireless signals via the antenna 937. The radio communication interface 933 may also be a chip module on which the BB processor 934 and the RF circuit 935 are integrated. As shown in FIG. 11, the radio communication interface 933 may include multiple BB processors 934 and multiple RF circuits 935. Although FIG. 11 shows an example in which the radio communication interface 933 includes multiple BB processors 934 and multiple circuits 935, the radio communication interface 933 may also include a single BB processor 934 or a single RF circuit 935.

Furthermore, in addition to the cellular communication scheme, the radio communication interface 933 may support other types of wireless communication schemes, such as a short-range wireless communication scheme, a near field communication scheme, and a wireless LAN scheme. In this case, the radio communication interface 933 may include a BB processor 934 and an RF circuit 935 for each wireless communication scheme.

Each of the antenna switches 936 switches a connection destination of the antenna 937 among multiple circuits included in the radio communication interface 933 (for example, circuits for different wireless communication schemes).

Each of the antennas 937 includes a single antenna element or multiple antenna elements (such as multiple antenna elements included in a MIMO antenna), and is used for the radio communication interface 933 to transfer and receive wireless signals. As shown in FIG. 11, the vehicle navigation device 920 may include multiple antennas 937. Although FIG. 11 shows an example in which the vehicle navigation device 920 includes multiple antennas 937, the vehicle navigation device 920 may also include a single antenna 937.

Furthermore, the vehicle navigation device 920 may include an antenna 937 for each wireless communication scheme. In this case, the antenna switch 936 may be omitted from the configuration of the vehicle navigation device 920.

The battery 938 supplies power to each block of the vehicle navigation device 920 as shown in FIG. 11 via a feeder line, which is partially shown as a dashed line in the figure. The battery 938 accumulates electric power supplied from the vehicle.

In the vehicle navigation device 920 as shown in FIG. 11, in a case that the electronic apparatus 100 described with reference to FIG. 1 is implemented as user equipment, a transceiver of the electronic apparatus 100 may be implemented by the radio communication interface 933. At least a part of the function may also be implemented by the processor 921. For example, the processor 921 may select a time-frequency resource block for initially transmitting a data block and/or a time-frequency resource block for retransmitting a data block by using the processing unit 101 described with reference to FIG. 1.

The technology according to the present disclosure may also be implemented as an in-vehicle system (or vehicle) 940 including one or more blocks in the vehicle navigation device 920, the in-vehicle network 941, and the vehicle module 942. The vehicle module 942 generates vehicle data (such as vehicle speed, engine speed, and failure information), and outputs the generated data to the in-vehicle network 941.

The basic principle of the present disclosure has been described above in conjunction with specific embodiments. However, it should be pointed out that, for those skilled in the art, it could be understood that all or any step or component of the methods and devices according to the present disclosure may be implemented in any computing device (including processors, storage media, and the like) or network of computing devices in the form of hardware, firmware, software, or a combination thereof. This can be achieved by those skilled in the art utilizing their basic circuit design knowledge or basic programming skills after reading the description of the present disclosure.

Moreover, a program product storing a machine-readable instruction code is further proposed according to the present disclosure. The instruction code, when read and executed by a machine, can execute the above-mentioned methods according to the embodiment of the present disclosure.

Accordingly, a storage medium for carrying the above-mentioned program product storing a machine-readable instruction code is also included in the disclosure of the present disclosure. The storage medium includes, but is not limited to, a floppy disk, an optical disk, a magneto-optical disk, a memory card, a memory stick, and the like.

Figure 12:
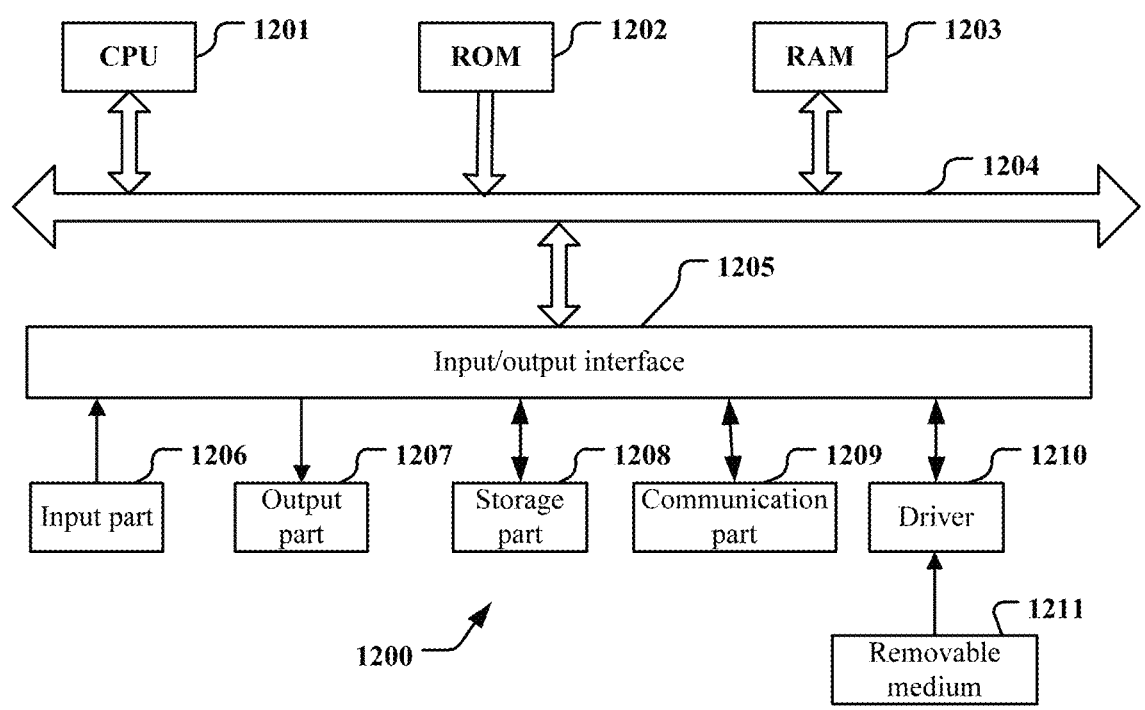
FIG. 12 is a block diagram showing an exemplary structure of a general-purpose personal computer capable of implementing the method and/or apparatuse and/or system according to the embodiments of the present disclosure.

In a case that the present disclosure is implemented by a software or a firmware, a program constituting the software is installed from a storage medium or a network to a computer with a dedicated hardware structure (for example, a general-purpose computer 1200 as shown in FIG. 12), and the computer, when installed with various programs, can execute various functions and the like.

In FIG. 12, a central processing unit (CPU) 1201 executes various processing in accordance with a program stored in a read only memory (ROM) 1202 or a program loaded from a storage part 1208 to a random access memory (RAM) 1203. In the RAM 1203, data required when the CPU 1201 executes various processing and the like is also stored as needed. The CPU 1201, the ROM 1202, and the RAM 1203 are connected to each other via a bus 1204. The input/output interface 1205 is also connected to the bus 1204.

The following components are connected to the input/output interface 1205: an input part 1206 (including a keyboard, a mouse, and the like), an output part 1207 (including a display, such as a cathode ray tube (CRT), a liquid crystal display (LCD), and the like, and a speaker, and the like), a storage part 1208 (including a hard disk, and the like), and a communication part 1209 (including a network interface card such as an LAN card, a modem, and the like). The communication part 1209 executes communication processing via a network such as the Internet. The driver 1210 may also be connected to the input/output interface 1205, as needed. A removable medium 1211 such as a magnetic disk, an optical disk, a magneto-optical disk, a semiconductor memory and the like is installed on the driver 1210 as needed, such that a computer program read out therefrom is installed into the storage part 1208 as needed.

In a case that the above-mentioned series of processing is implemented by a software, a program constituting the software is installed from a network such as the Internet or a storage medium such as the removable medium 1211.

Those skilled in the art should understand that, this storage medium is not limited to the removable medium 1211 as shown in FIG. 12 which has a program stored therein and which is distributed separately from an apparatus to provide a program to a user. Examples of the removable media 1211 include magnetic disks (including a floppy disk (registered trademark)), an optical disk (including a compact disk read-only memory (CD-ROM) and a digital versatile disk (DVD)), a magneto-optical disk (including a mini disk (MD) (registered trademark)), and a semiconductor memory. Alternatively, the storage medium may be the ROM 1202, a hard disk included in the storage part 1208, and the like, which have programs stored therein and which are distributed concurrently with the apparatus including them to users.

It should also be pointed out that in the devices, methods and systems according to the present disclosure, each component or each step may be decomposed and/or recombined. These decompositions and/or recombinations should be regarded as equivalent solutions of the present disclosure. Moreover, the steps of executing the above-mentioned series of processing may naturally be executed in chronological order in the order as described, but do not necessarily need to be executed in chronological order. Some steps may be executed in parallel or independently of each other.

Finally, it should be noted that, the terms "include", "comprise" or any other variants thereof are intended to cover non-exclusive inclusion, such that a process, method, article or apparatus that includes a series of elements not only includes those elements, but also includes other elements that are not explicitly listed, or but also includes elements inherent to such a process, method, article, or apparatus. Furthermore, in the absence of more restrictions, an element defined by sentence "including one . . . " does not exclude the existence of other identical elements in a process, method, article, or apparatus that includes the element.

Although the embodiments of the present disclosure have been described above in detail in conjunction with the accompanying drawings, it should be appreciated that, the above-described embodiments are only used to illustrate the present disclosure and do not constitute a limitation to the present disclosure. For those skilled in the art, various modifications and changes may be made to the above-mentioned embodiments without departing from the essence and scope of the present disclosure. Therefore, the scope of the present disclosure is defined only by the appended claims and equivalent meanings thereof.

This technology may also be implemented as follows.

(1). An electronic apparatus for wireless communications, including:
a processing circuit configured to:
select a time-frequency resource block for initially transmitting a data block and/or a time-frequency resource block for retransmitting a data block from at least a candidate resource set comprising predetermined candidate time-frequency resource blocks.

(2). The electronic apparatus according to (1), where the processing circuit is configured to:
divide a resource selection window including the candidate resource set into a predetermined number of sub-resource selection windows in a time dimension, such that each of the sub-resource selection windows has substantially the same time duration; and
select a candidate time-frequency resource block, from at least one chronologically preceding sub-resource selection window which includes at least one candidate time-frequency resource block, as the time-frequency resource block for initially transmitting the data block.

(3). The electronic apparatus according to (2), wherein the processing circuit is further configured to:
select a candidate time-frequency resource block satisfying a predetermined condition, from candidate time-frequency resource blocks chronologically after the time-frequency resource block for initially transmitting the data block in the resource selection window, as the time-frequency resource block for retransmitting the data block.

(4). The electronic apparatus according to (1), where the processing circuit is configured to:
divide a resource selection window including the candidate resource set into a predetermined number of sub-resource selection windows, such that each of the sub-resource selection windows includes substantially the same number of candidate time-frequency resource blocks; and
select a candidate time-frequency resource block from a most chronologically preceding sub-resource selection window as the time-frequency resource block for initially transmitting the data block.

(5). The electronic apparatus according to (4), where the processing circuit is further configured to:
select a candidate time-frequency resource block satisfying a predetermined condition, from candidate time-frequency resource blocks chronologically after the time-frequency resource block for initially transmitting the data block in the resource selection window, as the time-frequency resource block for retransmitting the data block.

(6). The electronic apparatus according to any one of (2) to (5), where,
in addition to the predetermined candidate time-frequency resource blocks, the candidate resource set further includes one or more candidate time-frequency resource blocks included in an abnormal resource pool which is different from a preconfigured resource pool including the predetermined candidate time-frequency resource blocks, and
the resource selection window further includes the one or more candidate time-frequency resource blocks in the abnormal resource pool.

(7). The electronic apparatus according to any one of (1) to (6), where the processing circuit is configured to:
between retransmitting the data block respectively using two time-frequency resource blocks based on a hybrid automatic repeat request acknowledgement (HARQ-ACK), perform at least one blind retransmission of the data block using at least one candidate time-frequency resource block included in the abnormal resource pool which is different from the preconfigured resource pool including the predetermined candidate time-frequency resource blocks.

(8). The electronic apparatus according to any one of (1) to (7), where,
the processing circuit is configured to: in a case that the candidate resource set does not include candidate time-frequency resource blocks which satisfy a predetermined retransmission time interval for retransmitting the data block based on a hybrid automatic repeat request acknowledgement (HARQ-ACK), increase a threshold of a reference signal received power (RSRP) to increase the number of the candidate time-frequency resource blocks in the candidate resource set to select candidate time-frequency resource blocks satisfying the predetermined retransmission time interval from the candidate resource set including the increased number of candidate time-frequency resource blocks for retransmitting the data block,
where the processing circuit is configured to include a time-frequency resource block having a RSRP lower than the threshold as a candidate time-frequency resource block in the candidate resource set in a resource awareness period in which the candidate time-frequency resource block is predetermined.

(9). The electronic apparatus according to any one of (1) to (7), where the processing circuit is configured to: in a case that the candidate resource set does not include candidate time-frequency resource blocks which satisfy a predetermined retransmission time interval for retransmitting the data block based on a hybrid automatic repeat request acknowledgement (HARQ-ACK), select candidate time-frequency resource blocks satisfying the predetermined retransmission time interval from at least one candidate time-frequency resource block included in the abnormal resource pool which is different from the preconfigured resource pool including the predetermined candidate time-frequency resource blocks for retransmitting the data block.

(10). The electronic apparatus according to any one of (1) to (7), where,
the processing circuit is configured to: in a case that the candidate resource set does not include candidate time-frequency resource blocks satisfying a predetermined retransmission time interval for retransmitting the data block based on a hybrid automatic repeat request acknowledgement (HARQ-ACK), change a method for retransmitting the data block by adding a field that indicates a method for retransmitting the data block in control information of data transmission, where the field is used to indicate that the retransmission of the data block is performed based on one of a hybrid automatic repeat request acknowledgement (HARQ-ACK), a blind retransmission as well as a hybrid retransmission including HARQ-ACK and blind retransmission.

(11). The electronic apparatus according to (10), where the control information is sidelink control information SCI.

(12). The electronic apparatus according to any one of (1) to (11), where the processing circuit is configured to select a time-frequency resource block for initially transmitting the data block and/or a time-frequency resource block for retransmitting the data block in a scenario of sidelink resource selection mode 2.

(13). A method for wireless communications, including:
selecting a time-frequency resource block for initially transmitting a data block and/or a time-frequency resource block for retransmitting a data block from at least a candidate resource set comprising predetermined candidate time-frequency resource blocks.

(14). A computer-readable storage medium storing computer-executable instructions, where when the computer-executable instructions are executed, the method for wireless communications according to (13) is performed.

The invention claimed is:

1. An electronic apparatus for wireless communications, comprising:
    processing circuitry configured to
        select a time-frequency resource block for initially transmitting a data block or a time-frequency resource block for retransmitting a data block from at least a candidate resource set including predetermined candidate time-frequency resource blocks;
        divide a resource selection window that includes the candidate resource set into a predetermined number of sub-resource selection windows along a time axis, such that each of the sub-resource selection windows has substantially the same time duration; and
        select a candidate time-frequency resource block, from at least an earliest one of the sub-resource selection windows which includes at least one candidate time-frequency resource block, as the time-frequency resource block for initially transmitting the data block, wherein
    the processing circuitry is further configured to
        in a case that the candidate resource set does not include candidate time-frequency resource blocks which satisfy a predetermined retransmission time interval for retransmitting the data block based on a hybrid automatic repeat request acknowledgement (HARQ-ACK), increase a threshold of a reference signal received power (RSRP) to increase the number of the candidate time-frequency resource blocks in the candidate resource set, and select candidate time-frequency resource blocks satisfying the predetermined retransmission time interval from the candidate resource set that includes an increased number of candidate time-frequency resource blocks for retransmitting the data block, and
        select a time-frequency resource block that has a RSRP lower than the threshold as a candidate time-frequency resource block in the candidate resource set in a resource awareness period in which the candidate time-frequency resource block is predetermined.

2. The electronic apparatus according to claim 1, wherein the processing circuitry is further configured to
    select a candidate time-frequency resource block satisfying a predetermined condition, from candidate time-frequency resource blocks that follow the time-frequency resource block that is selected for initially transmitting the data block in the resource selection window, as the time-frequency resource block for retransmitting the data block.

3. The electronic apparatus according to claim 1, wherein in addition to the predetermined candidate time-frequency resource blocks, the candidate resource set further includes one or more candidate time-frequency resource blocks included in an abnormal resource pool which is different from a preconfigured resource pool that includes the predetermined candidate time-frequency resource blocks, and
    the resource selection window further includes the one or more candidate time-frequency resource blocks included in the abnormal resource pool.

4. The electronic apparatus according to claim 1, wherein the processing circuitry is further configured to
    between retransmitting the data block twice respectively using two time-frequency resource blocks based on a hybrid automatic repeat request acknowledgement (HARQ-ACK), perform at least one blind retransmission of the data block using at least one candidate time-frequency resource block included in an abnormal resource pool which is different from a preconfigured resource pool that includes the predetermined candidate time-frequency resource blocks.

5. An electronic apparatus for wireless communications, comprising:
    processing circuitry configured to
        select a time-frequency resource block for initially transmitting a data block or a time-frequency resource block for retransmitting a data block from at least a candidate resource set including predetermined candidate time-frequency resource blocks;
        divide a resource selection window that includes the candidate resource set into a predetermined number of sub-resource selection windows, such that each of the sub-resource selection windows includes substantially the same number of candidate time-frequency resource blocks; and
        select a candidate time-frequency resource block from an earliest one of the sub-resource selection windows as the time-frequency resource block for initially transmitting the data block, wherein
    the processing circuitry is further configured to
        in a case that the candidate resource set does not include candidate time-frequency resource blocks which satisfy a predetermined retransmission time interval for retransmitting the data block based on a hybrid automatic repeat request acknowledgement (HARQ-ACK), select candidate time-frequency resource blocks satisfying the predetermined retransmission time interval from at least one candidate time-frequency resource block included in an abnormal resource pool which is different from a preconfigured resource pool that includes the predetermined candidate time-frequency resource blocks for retransmitting the data block.

6. The electronic apparatus according to claim 5, wherein the processing circuitry is further configured to select a candidate time-frequency resource block satisfying a predetermined condition, from candidate time-frequency resource blocks that follow the time-frequency resource block that is selected for initially transmitting the data block in the resource selection window, as the time-frequency resource block for retransmitting the data block.

7. The electronic apparatus according to claim 5, wherein the processing circuitry is further configured to in a case that the candidate resource set does not include candidate time-frequency resource blocks satisfying a predetermined retransmission time interval for retransmitting the data block based on a hybrid automatic repeat request acknowledgement (HARQ-ACK), change a method for retransmitting the data block by adding a field that indicates a method for retransmitting the data block in control information of data transmission, and the field is used to indicate that the retransmission of the data block is performed based on one of a hybrid automatic repeat request acknowledgement (HARQ-ACK), a blind retransmission, and a hybrid retransmission including the HARQ-ACK and the blind retransmission.

8. The electronic apparatus according to claim 7, wherein the control information is sidelink control information SCI.

9. The electronic apparatus according to claim 5, wherein the processing circuitry is further configured to select a time-frequency resource block for initially transmitting the data block or a time-frequency resource block for retransmitting the data block in a scenario of sidelink resource selection mode 2.

* * * * *